United States Patent [19]

Kearnan

[11] Patent Number: 4,564,670

[45] Date of Patent: Jan. 14, 1986

[54] DISPERSIBLE SULFUR PRODUCT AND ITS PROCESS OF MANUFACTURE

[75] Inventor: James E. Kearnan, Monongahela, Pa.

[73] Assignee: Stauffer Chemical Company, Westport, Conn.

[21] Appl. No.: 717,220

[22] Filed: Mar. 28, 1985

[51] Int. Cl.$^4$ .............................................. C08G 75/14
[52] U.S. Cl. ................................ 528/389; 252/188.31; 252/308
[58] Field of Search ........................... 252/188.31, 308; 528/389

[56] References Cited

U.S. PATENT DOCUMENTS

| 3,431,214 | 3/1969 | McDonald | 252/189 |
| 3,706,708 | 12/1972 | Kearnan | 260/79 |
| 4,110,240 | 8/1978 | Leo et al. | 252/182 |
| 4,311,826 | 1/1982 | McBee et al. | 528/389 |
| 4,348,313 | 9/1982 | McBee et al. | 528/389 |
| 4,391,969 | 7/1983 | McBee et al. | 528/389 |

OTHER PUBLICATIONS

Chemical Abstracts, 68, 10598j.
Chemical Abstracts, 69, 44923g.
Chemical Abstracts, 86, 191134e.
Chemical Abstracts, 95, 63544n.
Hardman, Inc. brochure, pp. 1 to 3, discussing DPR and Isolene.

*Primary Examiner*—Melvyn I. Marquis
*Attorney, Agent, or Firm*—Richard P. Fennelly

[57] ABSTRACT

A dispersed sulfur product having good flowability can be formed by dispersing particulate sulfur in a liquid poly(cis-isoprene) dispersion agent (i.e., either made by polymerizing synthetic cis-isoprene or by depolymerizing natural rubber). The sulfur product resulting therefrom has good dispersibility in rubber. The product can be formed without using an aqueous co-precipitation technique by simply mixing the liquid poly-(cis-isoprene) dispersion agent with a major amount of sulfur until the desired product results.

20 Claims, No Drawings

DISPERSIBLE SULFUR PRODUCT AND ITS PROCESS OF MANUFACTURE

FIELD OF THE INVENTION

The present invention is directed to a sulfur product readily dispersible in rubber and for the process of making it. More particularly, the present invention is directed to a dispersible grade of insoluble sulfur and a process for obtaining such a product.

DESCRIPTION OF THE PRIOR ART

German Pat. No. 1,262,245 describes insoluble sulfur mixed with bitumen to yield an insoluble sulfur product free of electrostatic charge which is dispersible in rubber.

The use of hexylene glycol to yield a nonelectrostatic, free-flowing, dust-free insoluble sulfur is described in German Pat. No. 1,271,685.

A pelletized sulfur composition formed by mixing sulfur and dibenzothiazolyl disulfide is described in Japanese Kokai No. 77/22,593.

Non-dusting sulfur dispersions for vulcanization are mentioned in Japanese Kokai Tokkyo Koho No. 81/32,230. They are prepared by mixing sulfur, a dispersible, non-*hygroscopic, nondeliquescent powder which is less agglomerating than sulfur, and an antidusting oil.

U.S. Pat. No. 3,706,708 to J. E. Kearnan et al. indicates that the dispersibility, in rubber, of insoluble sulfur used for vulcanizing can be improved by admixing an alkylphenoxypoly(ethyleneoxy)ethanol with the sulfur.

It has also been suggested that a method of making a non-dusting, free flowing stable sulfur pellet can be achieved by compacting a mixture of sulfur with a minor amount of petrolatum. This disclosure is contained in U.S. Pat. No. 3,431,214 to H. McDonald.

A co-precipitation process for mixing various predispersed rubber or plastic compounding chemicals is described in U.S. Pat. No. 4,110,240 to Leo et al. This patent indicates that an aqueous formulation is first formed which comprises the rubber or plastic compounding chemical along with a film forming binder comprising a rubber or plastic polymer. The resulting product is then coagulated, using a coagulation agent, to coprecipitate the compounding chemical and the binder material. This step forms a substantially clear serum and a homogeneous, essentially non-tacky composition comprising particles of the compounding chemical, the binder, and residual coagulation agent.

SUMMARY OF THE PRESENT INVENTION

The present invention relates to a method of forming a predispersed sulfur without the use of the type of aqueous coprecipitation process described in the Leo et al. patent. The present invention relates to dispersing particulate sulfur, e.g., insoluble sulfur, in a liquid poly(cis-isoprene) dispersion agent. The sulfur and dispersion agent are agitated for a sufficient length of time to produce a flowable, particulate sulfur dispersion which consists essentially of the sulfur dispersed in the poly(cis-isoprene) dispersion agent. There is a substantial absence of any latex coagulation agent of the type that is needed if one were to practice the Leo et al. technology.

DETAILED DESCRIPTION OF THE PRESENT INVENTION

The present invention is directed to a method of forming flowable, particulate sulfur which can be extruded or pelletized at a later point in time, if desired. The present invention is a product which is non-dusting and non-static thereby overcoming certain undesirable traits of non-dispersed sulfurs. Similarly, the product is a flowable powder and can be later compacted or extruded, if desired. The product disperses well in rubber when it is used as a vulcanizing agent and, in a preferred embodiment, when an insoluble sulfur product is used, the stability of the insoluble sulfur is maintained if care is taken in the selection of the dispersing agent used.

The present invention is broadly applicable to predispersing conventional sulfur products that are known to persons of ordinary skill in the art. In a preferred embodiment, insoluble sulfur (e.g., available under the trademark CRYSTEX from Stauffer Chemical Company) is a preferred sulfur for practice in regard to the present invention. The insoluble sulfur content of the insoluble sulfur can be at 30% or above, preferably 60% or above, most preferably 90% or above. This preferred sulfur is a known product and is described, for example, in U.S. Pat. No. 3,706,708 which has been discussed before. Generally, the amount of sulfur (either conventional or insoluble), which can be used in conjunction with the present invention, can range anywhere from about 40%, by weight, up to about 95%, by weight, preferably no less than about 60%, by weight.

The dispersing agent which is used in conjunction with the present invention is a liquid poly(cis-isoprene) material. This material is obtainable in two general ways. The first way is to depolymerize natural rubber which is a high molecular weight material that contains cis-isoprene units in polymeric form. Natural rubber is defined as cis-1,4-polyisoprene with a molecular weight of from about 100,000 to about 1,000,000. Another way of obtaining the dispersion agent which is desired for the present invention is to polymerize synthetic cis-isoprene so that a liquid material results.

Commercially available sources for either of the two foregoing derived dispersion agents exist. A suitable depolymerized rubber product that has been found to be acceptable are the DPR brands from Hardman Inc. A suitable liquid poly(cis-isoprene) product which has been found to be acceptable is available under the trademark ISOLENE 40 from Hardman Inc.

The present invention is simply practiced by blending the desired sulfur product with the liquid poly(cis-isoprene) dispersion agent using suitable agitation to uniformly disperse the sulfur in the dispersion agent. Generally, the amount of liquid poly(cis-isoprene) dispersion agent which can be used ranges anywhere from about 60% down to about 5% by weight of the dispersion,, preferably at about 40% or less.

The product that results from mixing the sulfur and the dispersion agent is a flowable, particulate sulfur product which, as will be demonstrated in the Examples which follow, has good dispersion and, in the case of insoluble sulfur, generally good stability retention in most cases, particularly when a liquid poly(cis-isoprene) dispersion agent is made from synthetic cis-isoprene.

The following Examples illustrate certain embodiments of the present invention.

EXAMPLE 1

Method of Blending Sulfur and Liquid Rubber Dispersion Agent

A counterrotating, sigma blade, laboratory mixer was used to disperse sulfur powder (CRYSTEX brand insoluble sulfur) in a liquid poly(cis-isoprene) material. The mixer bowl had a capacity of about 1.5 liters. The first step was to weight out 250 grams of insoluble sulfur into a suitable container. The mixer lid was then removed, and the sulfur was cautiously poured into the mixer preventing it from dusting into the air. The mixer cover was replaced and was fastened down. In order to prepare a blend of 80% sulfur and 20% liquid rubber, about 70 grams of liquid rubber was weighed out into a disposable paper cup. A short, wide-stemmed funnel was also weighed. The funnel was placed through a hole in the center of the mixer lid, and the mixer was turned on to agitate the sulfur. The liquid rubber was poured into the funnel and was allowed to drip slowly into the mixer. When the rubber had been added, the funnel was re-weighed, and the paper cup was also re-weighed to determine the total amount of rubber additive that was added. The mixer was allowed to run for about 10 minutes after completion of the addition. The lid was then removed and all the sulfur was scraped off the lid and sides of the mixer back into the batch in the mixer. The lid was replaced and the mixer was run for five more minutes. After this period of time was over, the lid was removed, and the scraping and mixing procedure was repeated. The mixer was then turned off, the lid was removed, and the finished batch of treated sulfur was cleaned out.

Test for Measuring Sulfur Dispersibility in Rubber

The aforementioned dispersion of sulfur sample was measured by visually inspecting a white rubber stock to count the number of yellow sulfur spots visible on the surface of each side of the rubber, if any. In order to perform this dispersibility test, the first step was the preparation of a white, natural rubber stock in which the sulfur and rubber curing agents could be added for the test. The formulation for the white stock was as follows: natural rubber, pale crepe (100 parts by weight); silica pigment (20 pbw); titanium dioxide (16 pbw); zinc oxide (5 pbw); stearic acid (2 pbw); and phenolic antioxidant (1 pbw).

To test individual samples of sulfur, a 12 inch×6 inch, 2-roll laboratory mill equipped with oil heated rolls was used as the mixing equipment. The mill roll temperatures were controlled to make the stock temperature about 103.5°–105.5° C. on the rolls as the mill was running. The temperature was measured by reading a needle pyrometer with the needle immersed in the rubber sheet on the front roll as the mill was turning.

The first step was to weigh out 432 grams of the white rubber stock (three times the formula weight). Also weighed out was 3 grams of 2,2-benzothiazyl disulfide, 0.3 gram of zinc dimethyl dithiocarbamate, and 7.5 grams of insoluble sulfur. If the sulfur contained any additives, the amount weight of product used was correspondingly increased to insure adding 7.5 grams of sulfur to the mix. The rubber was mixed in accordance with the following schedule: breakdown of the rubber by passing the white compound through the rolls until softened; banding the rubber on the front mill and starting a timer; after 1 minute, adding the zinc dimethyl dithiocarbamate and 2,2-benzothiazyl disulfide into the rubber; at 4 minutes, adding the sulfur to the mix; as soon as the sulfur completely entered the rubber, measuring the stock temperature with the pyrometer; completing the blending of the entire mixture; and, at the end of 8 minutes, cutting the rubber stock from the rolls and placing it on a clean polyethylene sheet to cool.

After the rubber stock had cooled, a 63 gram piece of rubber was cut from the cooled sheet. This piece was placed in a heated chrome-plated mold to mold a sheet 6 inch×6 inch×0.075 inch in dimension. The sheet was then cured in a heated rubber press at 160° C. for 15 minutes. It was then removed and cooled in water and dried using a clean absorbent paper towel. Each side of the cut rubber sheet was then inspected under a strong light, and the number of brown-yellow spots, which were obviously sulfur particles imbedded in the rubber, were counted. The sum of the number of particles counted from each side of the rubber sheet, divided by two, was reported as the dispersion rating for that sulfur. The lower the number, the better the rating. Table 1 set forth below gives the ratings that were obtained. It will be appreciated from the foregoing that either the use of cis-polyisoprene liquid rubber or depolymerized natural rubber gives better results than the use of styrene-butadiene liquid rubber (which was actually worse than the control) or the use of cis-polybutadiene liquid rubber. In Table 1, the cis-polyisoprene liquid is ISOLENE 40 rubber from Hardman, Inc. The depolymerized natural rubber is DPR 40 rubber, also from Hardman, Inc.

TABLE 1

| Coating | Sulfur Coating Ratio | Dispersion Rating (Av. No. Particles) |
| --- | --- | --- |
| Napththenic Oil (Control) | 80/20 | 11 |
| Cis-Polyisoprene Liquid | 95/5 | 5 |
| Cis-Polyisoprene Liquid | 90/10 | 3 |
| Cis-Polyisoprene Liquid | 85/15 | 0 |
| Cis-Polyisoprene Liquid | 80/20 | 0 |
| Cis-Polyisoprene Liquid | 75/25 | 0 |
| Depolymerized Nat. Rubber | 80/20 | 0 |
| Depolymerized Nat. Rubber | 80/20 | 0 |
| Styrene-butadiene Liquid* | 80/20 | 18 |
| Cis-Polybutadiene Liquid* | 80/20 | 7 |

*not part of the present invention. Presented for comparison only.

The low molecular weights cis-polyisoprene liquid gave excellent dispersion with some odor. The depolymerized natural rubber dispersion agent also gave excellent dispersion with a stronger odor and a dark color to the final product.

EXAMPLE 2

This Example illustrates the dispersion and stability data obtained when insoluble sulfur of the same general type from different chemical plant sources was treated with a naphthenic oil (as a control) and either a depolymerized natural rubber dispersion aid (DPR 40 brand from Hardman Inc.) or a liquid polymerized cis-isoprene dispersion aid (ISOLENE 40 brand from Hardman Inc.). In all cases, unless noted, the ratio of sulfur to treating agent was 80/20.

| | Stability Data* | |
| --- | --- | --- |
| Insoluble Sulfur** | Naphthenic Oil | Polymerized Cis-Isoprene |
| A | 55 | 48 |
| B | 82 | 74 |

-continued

| | Stability Data* | |
|---|---|---|
| C | 83 | 76 |
| D | 74 | 68 |

| Insoluble Sulfur** | Naphthenic Oil | Depolymerized Nat. Rubber |
|---|---|---|
| A | 55 | 43 |
| B | 82 | 0.8 |
| C | 83 | 31 |
| D | 74 | 33 |

*% insoluble sulfur in the sulfur product as measured in white mineral oil at 105° C. Aged for 15 minutes at this temperature.
**from different plant sources. The oil absorption values (in ml. of oil/100 gm. of sulfur varies: A: 55–65; B: 70–80; C: 80–90; and D: 58–68. These values are a partial measure of the differing particle size distribution for the various sulfur samples tested.

At a weight ratio of 85/15 the stability values for the polymerized cis-isoprene were 52, 80, 82 and 76 respectively. At an 85/15 ratio, the stability values for the depolymerized natural rubber dispersion aid were 58, 3, 43 and 45, respectively.

Dispersion Data

The following dispersion data was generated at an 80/20 sulfur/dispersion weight ratio:

| Insoluble Sulfur Type | Naphthenic Oil | Polymerized Cis-Isoprene |
|---|---|---|
| A | 18 | 3 |
| B | 13 | 2 |
| C | 100+ | 5 |
| D | 33 | 2 |

| Insoluble Sulfur Type | Naphthenic Oil | Depolymerized Nat. Rubber |
|---|---|---|
| A | 18 | 0 |
| B | 13 | 0 |
| C | 100+ | 2 |
| D | 33 | 6 |

At a ratio of 85/15, the polymerized cis-isoprene gave dispersibility readings of 3, 2, 19 and 4, respectively. The depolymerized natural rubber at an 85/15 ratio gave readings of 10, 6, 15 and 21 respectively.

EXAMPLE 3

This is an additional test that was conducted of dispersibility and stability using the "Type A" sulfur from Example 2.

| Coating | Sulfur/Coating Ratio | Dispersion Rating | % Insoluble Sulfur |
|---|---|---|---|
| Cis-Polyisoprene Liq.* | 85/15 | 3 | 52 |
| Cis-Polyisoprene Liq.* | 80/20 | 1 | 43 |
| Depolymerized Nat. Rubber** | 80/20 | 0 | — |
| Depolymerized Nat. Rubber*** | 80/20 | 1 | 43 |

*ISOLENE 40 brand from Hardman, Inc.
**DPR 35 brand from Hardman, Inc.
***DPR 40 brand from Hardman, Inc.

Good agreement with the results in Examples 1 and 2 is apparent.

The foregoing should be construed as preferred embodiments of the present invention and should not be construed in a limiting sense. The claims which follow set forth the scope of protection desired.

I claim:

1. A flowable, particulate sulfur dispersion consisting essentially of particulate sulfur dispersed in liquid poly(-cis-isoprene) dispersion agent in the substantial absence of a latex coagulation agent.

2. A sulfur dispersion as claimed in claim 1 wherein the sulfur is present at from about 40% to about 95%, by weight.

3. A sulfur dispersion as claimed in claim 1 wherein the liquid poly(cis-isoprene) is present at from about 60% to about 5%, by weight.

4. A sulfur dispersion as claimed in claim 1 wherein the liquid poly(cis-isoprene) is a synthetic cis-isoprene.

5. A sulfur dispersion as claimed in claim 1 wherein the liquid poly(cis-isoprene) is depolymerized natural rubber.

6. A sulfur dispersion as claimed in claim 1 wherein the sulfur is present at from about 40% to about 95%, by weight, and the liquid poly(cis-isoprene) is present at from about 60% to about 5%, by weight.

7. A sulfur dispersion as claimed in claim 6 wherein the liquid poly(cis-isoprene) is a synthetic cis-isoprene.

8. A sulfur dispersion as claimed in claim 6 wherein the liquid poly(cis-isoprene) is depolymerized natural rubber.

9. A sulfur dispersion as claimed in any of claims 1–8 wherein the sulfur is insoluble sulfur.

10. A sulfur dispersion as claimed in any of claims 1–8 wherein the sulfur is insoluble sulfur having an insoluble sulfur content of at least about 30%.

11. A process for forming a flowable, particulate sulfur dispersion consisting essentially of particulate sulfur dispersed in liquid poly(cis-isoprene) dispersion agent which comprises mixing the sulfur and liquid poly(cis-isoprene), in the substantial absence of water, until the flowable, particulate sulfur dispersion is obtained without coagulation from an aqueous latex solution.

12. A process as claimed in claim 11 wherein the sulfur is present at from about 40% to about 95% by weight.

13. A process for sulfur dispersion as claimed in claim 11 wherein the liquid poly(cis-isoprene) is present at from about 60% to about 5%, by weight.

14. A process for sulfur dispersion as claimed in claim 11 wherein the liquid poly(cis-isoprene) is a synthetic cis-isoprene.

15. A process for sulfur dispersion as claimed in claim 11 wherein the liquid poly(cis-isoprene) is depolymerized natural rubber.

16. A process for sulfur dispersion as claimed in claim 11 wherein the sulfur is present at from about 40% to about 95%, by weight, and the liquid poly(cis-isoprene) is present at from about 60% to about 5%, by weight.

17. A process for sulfur dispersion as claimed in claim 16 wherein the liquid poly(cis-isoprene) is a synthetic cis-isoprene.

18. A process for sulfur dispersion as claimed in claim 16 wherein the liquid poly(cis-isoprene) is depolymerized natural rubber.

19. A process for sulfur dispersion as claimed in any of claims 11–18 wherein the sulfur is insoluble sulfur.

20. A process for sulfur dispersion as claimed in any of claims 11–18 wherein the sulfur is insoluble sulfur having an insoluble sulfur content of at least about 30%.

* * * * *

UNITED STATES PATENT AND TRADEMARK OFFICE
CERTIFICATE OF CORRECTION

PATENT NO. : 4,564,670
DATED : January 14, 1986
INVENTOR(S) : James E. Kearnan

It is certified that error appears in the above—identified patent and that said Letters Patent is hereby corrected as shown below:

Col. 1, line 27, "non-*hygroscopic" should read -- non-hygroscopic --;

Col. 3, line 9, "weightout" should read -- weigh out --; and

Col. 4, line 67, the value "48" under the heading "Polymerized Cis-Isoprene" should read -- 43 --.

Signed and Sealed this

Thirteenth Day of May 1986

[SEAL]

Attest:

DONALD J. QUIGG

Attesting Officer

Commissioner of Patents and Trademarks